US006381621B1

United States Patent
Hamilton

(10) Patent No.: US 6,381,621 B1
(45) Date of Patent: Apr. 30, 2002

(54) METHOD OF CONSTRUCTING UNIT NAMES FROM A NONORTHOGONAL BASIS SET

(75) Inventor: Bruce Hamilton, Menlo Park, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/303,826

(22) Filed: Apr. 30, 1999

(51) Int. Cl.[7] ................................. G06F 7/00

(52) U.S. Cl. ..................................... 708/206

(58) Field of Search ................. 708/200, 206

(56) References Cited

PUBLICATIONS

IEEE Standard for a Smart Transducer Interface for Sensors and Actuators—Transducer to Microprocessor Communication Protocols and Transducer Electronic Data Sheet (TEDS) Formats, IEEE Std. 1451.2–1997.
Bruce Hamilton, HP Laboatories Technical Report, "A Compact Representation of Units", May 1996.

Primary Examiner—Tan V. Mai
(74) Attorney, Agent, or Firm—Robert T. Martin

(57) ABSTRACT

Process for generating unit names from a nonorthogonal set of units. Given a vector of exponents describing a target unit in terms of SI units, and a table of user defined units which may be nonorthogonal, one or more result unit names equivalent to the target unit are generated by recursively searching the table of user defined units, reducing the magnitude of the target in each step.

12 Claims, 1 Drawing Sheet

METHOD OF CONSTRUCTING UNIT NAMES FROM A NONORTHOGONAL BASIS SET

BACKGROUND OF THE INVENTION

1. Field of the Invention

The present invention deals with computer software for the display of physical units reported by transducers, especially in automatically constructing unit names for human use from transducers complying with the IEEE 1451.2 standard.

2. Art Background

When a quantity is measured in one place and displayed in another, it is necessary to get the measurement accurately from the source to the destination. A measured quantity comprises a number and a unit; for example a particular measured distance comprises the number 3 and the unit meters. The process of representing numbers is well understood. The process of displaying units is not. Evolving instrumentation standards such as IEEE 1451.2 require that units measured and reported by transducers be represented by binary numbers corresponding to unscaled SI units (Le Système International d'Unités). Representation of units in the 1451.2 standard is unlike most unit representations. Rather than merely being a list of names and scale factors, or a pointer to a list of names, the 1451.2 unit is a vector of exponents of SI base units.

The IEEE 1451.2 standard is described in IEEE Std 1451.2—1977 *IEEE Standard for a Smart Transducer Interface for Sensors and Actuators—Transducer to Microprocessor Communications Protocols and Transducer Electronic Data Sheet (TEDS) Formats*, published by the Institute of Electrical and Electronics Engineers, Inc., September 1998, incorporated herein by reference.

While the SI system defines a set of base units, in terms of which other units may be derived, these units, such as the meter for length and kilogram for mass, may not be easily readable or useable by humans in a particular situation. For example, while a pressure transducer reports its readings in SI units of kilograms/meter$^2$, the users of the system may be accustomed to readings displayed as lb/in$^2$. The problem here is not the simple problem of units conversion, converting for example between meters and furlongs, or between kilograms and troy ounces. The problem here is one of constructing unit names using user-defined units rather than SI units to more readily present information to human users.

The current state of the art deals with the naming problem as follows. In the simplest approach, given a table of base SI units and a target SI unit (not necessarily a base unit), the table is searched for the target. If it is present, the name is emitted. If the target is not present, a name is constructed using SI base unit names.

A slightly more robust approach makes use of a table containing both base and compound SI units. The table is searched, emitting unit names for base SI units and supplied SI compound units. For units not present in the table, names are expressed in terms of SI base units.

To this may be added a second table of user-defined units (not necessarily base units). Given a target, if it is matched exactly by a unit in this second table, that name is emitted. If the target is not found in this second table, processing continues as in the other approaches, expressing the name in terms of SI base units.

The above mentioned prior art methods can only express names for previously unseen units in terms of SI base units.

What is needed is a process which given a set of user-defined unit names, constructs unit names for a target unit in terms of those user-defined unit names, without having to anticipate all possible unit names or carry a dictionary of all possible unit names.

SUMMARY OF THE INVENTION

A method for constructing names from a set of user-defined unit names is disclosed. Given a target unit and a set of non-orthogonal user-defined units, one or more equivalent names for the target unit are generated through recursively searching the target name space, optimizing and pruning the search to find unit names of lowering magnitude until an appropriate result or results are achieved.

BRIEF DESCRIPTION OF THE DRAWINGS

The present invention is described with respect to particular exemplary embodiments thereof and reference is made to the drawings in which.

DETAILED DESCRIPTION

Figure 1:
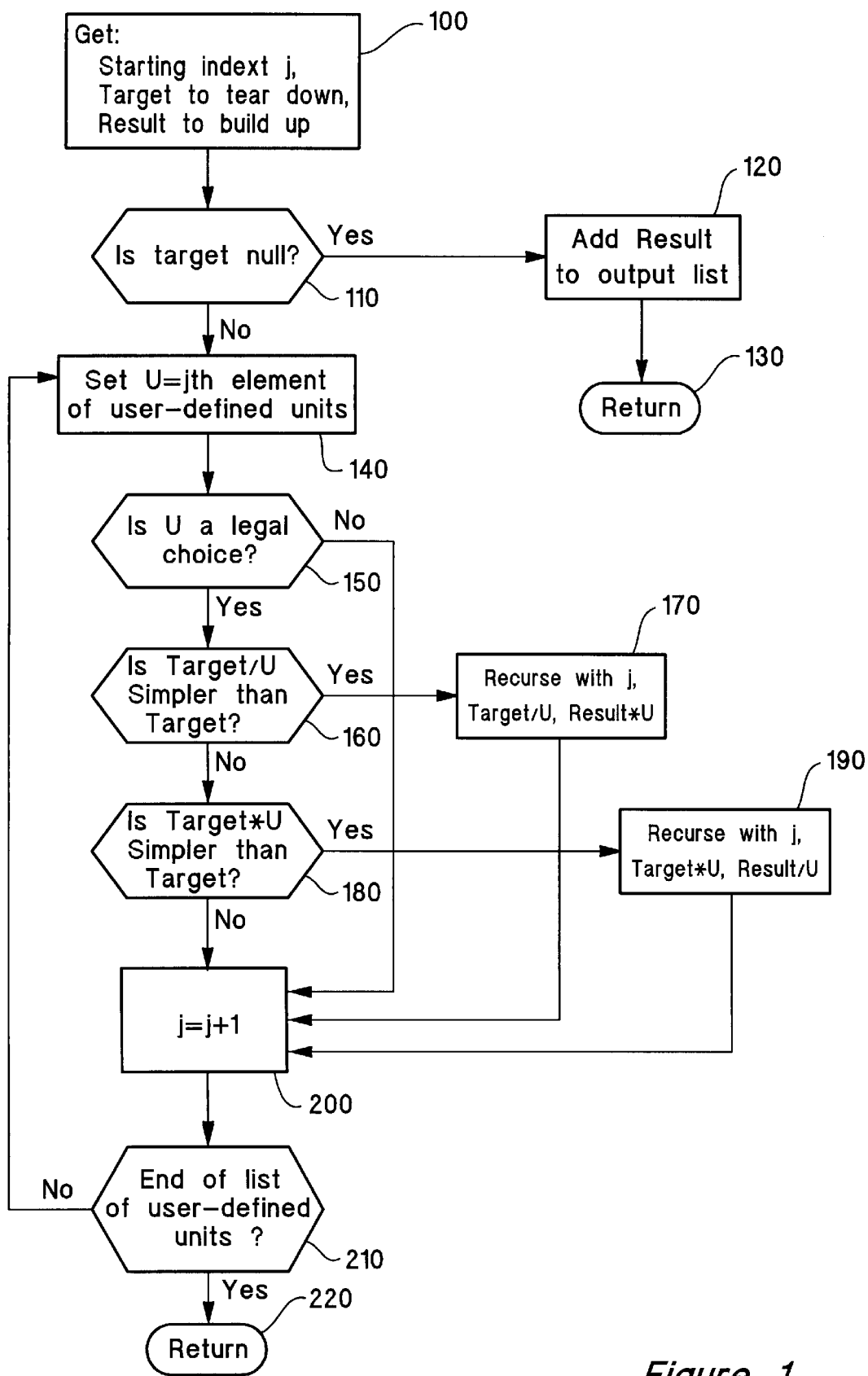
FIG. 1 shows the process for forming unit names according to the present invention.

A transducer (sensor or actuator) reports its state by generating or accepting a number and specifying a unit applicable to that number. The unit used by the transducer is formed from a basis set of units. For transducers using the IEEE 1451.2 representation of units, the basis set is the SI basis set—meter, kilogram, second, ampere, Kelvin, mole, candela—plus two others which SI says are supplemental: radian and steradian. Other physical quantities, such as pressure, are built by multiplying and dividing the members of the basis set together. This is an orthogonal basis set because no member can be constructed by multiplying and dividing the others together. In SI any product and/or quotient of SI basis units is an SI unit. The SI unit for acceleration therefore is m/sec$^2$. Notice that there is just one SI unit for any given physical quantity. The units representation in systems such as 1451.2 for example is not a name, or an index into a list of names, but is instead a vector of exponents of SI base units.

For the present invention, the SI basis set is defined as:

TABLE 1

| Dimension | Unit | Plural | Abbrev | Signature Vector | Scale | Offset |
|---|---|---|---|---|---|---|
| angle | radian | radians | rad | 1,0,0,0,0,0,0,0 | 1 | 0 |
| spherical angle | steradian | steradians | ste | 0,1,0,0,0,0,0,0 | 1 | 0 |
| distance | meter | meters | m | 0,0,1,0,0,0,0,0 | 1 | 0 |
| mass | kilogram | kilograms | kg | 0,0,0,1,0,0,0,0 | 1 | 0 |
| time | second | seconds | s | 0,0,0,0,1,0,0,0 | 1 | 0 |
| current | ampere | amperes | A | 0,0,0,0,0,1,0,0 | 1 | 0 |

TABLE 1-continued

| Dimension | Unit | Plural | Abbrev | Signature Vector | Scale | Offset |
|---|---|---|---|---|---|---|
| temperature | kelvin | kelvins | K | 0,0,0,0,0,0,1,0,0 | 1 | 0 |
| amount | mole | moles | mol | 0,0,0,0,0,0,0,1,0 | 1 | 0 |
| light | candela | candelas | cd | 0,0,0,0,0,0,0,0,1 | 1 | 0 |

This signature is similar to that presented in the 1451.2 standard in Section 3.8.8, Physical units. The column labeled Dimension shows the SI quantity, here abbreviating "amount of substance" to "amount" and "luminous intensity" to "light." For each unit the name, its plural form, and its abbreviation are defined. The abbreviation will be used wherever possible. The Signature vector (or just vector) is the vector of 9 exponents of SI base units as used for example in the IEEE 1451.2 standard. This set forms an orthogonal basis; each unit has a 1 in only one position and zeroes elsewhere.

Since Table 1 provides a complete basis set for SI units, any unit not named in this basis set may be constructed from it. For example, using this basis set, Hertz is defined as $sec^{-1}$ or 1/sec:

TABLE 2

| Dimension | Unit | Plural | Abbrev | Signature | Scale | Offset |
|---|---|---|---|---|---|---|
| frequency | hertz | hertz | Hz | 0,0,0,0,-1,0,0,0,0 | 1 | 0 |

The Scale and Offset values are used in translating from SI units to another unit. For example, while SI defines temperature in degrees kelvin, a definition of degrees Fahrenheit would be:

TABLE 3

| Dimension | Unit | Plural | Abbv | Signature | Scale | Offset |
|---|---|---|---|---|---|---|
| temperature | deg F | deg F | F | 0,0,0,0,0,0,1,0,0 | 1.8 | −459.67 |

This shows the conmmon conversion, multiplying by 1.8 and subtracting 459.67.

In making use of SI units, especially with reference to 1451.2 transducers, the problem of generating unit names for ease of human use becomes more acute, especially when dealing with compound units which make reference to more than one basis unit. For example, a transducer may report a unit with the signature {0,0,2,1,−3,−3,0,0,0} which gives the canonical SI unit name $m^2$ kg $sec^{-3} A^{-1}$. While the unit name $m^2$ kg $sec^{-3} A^{-1}$ is correct in terms of formal SI parlance, humans tend to prefer the equivalent term volt.

Other compound units making reference to more than one basis unit include, for example:

TABLE 4

| Dimension | Unit | Plural | Abbv | Signature | Scale | Offset |
|---|---|---|---|---|---|---|
| emf | volt | volts | V | 0,0,2,1,−3,−1,0,0,0 | 1 | 0 |
| speed | | | | 0,0,1,0,−1,0,0,0,0 | 1 | 0 |
| acceleration | gravity | gravities | g | 0,0,1,0,−2,0,0,0,0 | 9.8 | 0 |
| acceleration | | | | 0,0,1,0,−2,0,0,0,0 | 1 | 0 |
| force | poundf | poundsf | lb | 0,0,1,1,−2,0,0,0,0 | 4.448221 | 0 |
| pressure | pascal | pascals | Pa | 0,0,−1,1,−2,0,0,0,0 | 1 | 0 |
| pressure | psi | psi | psi | 0,0,−1,1,−2,0,0,0,0 | 6894.757 | 0 |

Speed is defined in SI units as distance (meters) divided by $time^{-1}$ ($seconds^{-1}$), or meters/second. Acceleration is distance per $second^{-2}$, or meters/$second^2$. Acceleration in gravities is equal to 9.8 times the SI unit. The composite unit pressure is composed of the basis units $distanced^{-1}$ mass $time^{-2}$.

The current state of the art for producing a unit name for a target unit is to look up the target unit in a table of user-defined units and use the user-defined unit name if an exact match is present, otherwise construct a unit name out of SI basis units. For example, assume the target unit has the signature vector {0,0,−1,1,−2,0,0,0,0}. Using table 4, exact matches are found for two units of pressure: pascals, and psi. If an exact match for the target is not found, for example using Table 1 not containing any unit with this target signature, a compound name may be generated from the orthogonal set of SI units. For each nonzero exponent in the target vector, the SI unit which has a 1 in that position and zeroes everywhere else is found. That unit name is emitted, along with the exponent which appears in the target. Exponents of plus or minus one are commonly suppressed; negative exponents indicate division. Notice that this process works only because the basis set is orthogonal. For the target given, namely {0,0,−1,1,−2,0,0,0,0}, the not so familiar unit name $meters^{-1}$ kilograms $seconds^{-2}$ is generated, which may be canonically rearranged to produce kilograms/(meter $second^2$). Thus given a table of user-defined units and SI basis units, user-defined unit names will be shown when exact matches are available, and when not available a composite unit name is generated from the SI basis. This construction process is guaranteed to produce a result, and only one result.

The current invention forms unit names for a target unit from a set of user-defined units which provide a basis for the target, but may be non-orthogonal. This means that each dimension in the target must be represented by one or more elements of the set, but each element of the set may be a composite unit, possibly containing more than one SI unit.

Given a list of units such as that shown in Table 4, which is nonorthogonal, the simple enumeration process described above for generating unit names from the orthogonal set of SI base units does not work.

The process for forming unit names according to the present invention is shown in FIG. 1. The process may be implemented in any computer language supporting recursion. The process uses a set of user-defined units, a target, and a result. The target is the vector of SI units for which a unit name is to be found. The set of units is assumed to form a basis for the target; each nonzero dimension in the target represented at least once by a corresponding dimension in one of the units in the set. Optionally a complete covering all SI units may be used; this optional set need not be orthogonal, and need not be restricted to SI units. The result of the process is one or more unit names equivalent to the target.

The process shown in FIG. 1 does a recursive search to generate unit names. In performing this search, a figure of merit called magnitude is used. The magnitude of a vector is the sum of the absolute value of two times each component. For example, the magnitude of the target vector $\{0,0,-1,1,-2,0,0,0\}$ is 8. The factor of two is an optional simplification used to ensure the magnitude is always an integer; one occasionally deals with units raise to the power 1/2, -1/2, or 3/2. Multiplying by two ensures integer values.

In each pass through the search, a test is made to see if applying the proposed unit results in reducing the magnitude of the target. If the magnitude of the target is reduced, the proposed unit is used to form the unit name. If the magnitude is not reduced, that proposed unit is not used.

The process works by finding user-defined units which are factors of the target, in the sense that dividing the target by the user-defined unit results in a smaller target magnitude.

If the process completes, that is if the target is reduced to a magnitude of zero, then the product of all the user-defined units used is the equivalent of the target, and the product of their names is a name for the equivalent unit. Similarly, the product of their scale factors is the scale factor for converting from the target to the equivalent unit just defined.

The product of two units each represented by a vector of exponents is computed by forming the sum of the exponents. For example, the vector $\{0,1,2,0,0,0,0,0\}$ times the vector $\{0,0,1,-2,0,0,0,0\}$ is $\{0,1,3,-2,0,0,0,0\}$. Similarly, the quotient of two units is computed by forming the difference of the exponents. The null vector is the vector whose exponents are all zero. Division is used to reduce the target, and multiplication is used to build up the result.

The process begins with a target whose name is to be constructed, a set of (user-defined) units, a null result, and an index into the set of units which is set to the first unit in the set. For the purposes of this example, assume that the target unit is a pressure, identified by a vector as follows:

Target: $\{0,0,-1,1,-2,0,0,0\}$

Referring back to Table 1, this unit has the dimensions of meters$^{-1}$ kilograms seconds$^{-2}$ or kilograms/(meter seconds$^2$). Also assume the units table consists of the following four entries, identified by the index value shown:

TABLE 5

| Dimension | Unit | Plural | Abbv | Signature | Scale | Offset |
|---|---|---|---|---|---|---|
| 0: force | poundf | poundsf | lb | 0,0,1,1,-2,0,0,0,0 | 4.44822162 | 0 |
| 1: distance | inch | inches | in | 0,0,1,0,0,0,0,0,0 | 0.0254 | 0 |
| 2: time | hour | hours | hr | 0,0,0,0,1,0,0,0,0 | 3600. | 0 |
| 3: temperature | deg F | degs F | F | 0,0,0,0,0,0,1,0,0 | 1.8 | 459.67 |

Note that no exact match for the target $\{0,0,-1,1,-2,0,0,0,0\}$ is present in Table 4. Since nonorthogonal units are present in Table 4, the simple enumeration procedure described earlier cannot be used to generate a unit name. The process goal is to reduce the magnitude of the target to 0, building up the result to achieve the unit name.

Before beginning the process, an optional step is to eliminate any unit in the table which cannot contribute to the result. Examining the target vector $\{0,0,0,-1,1,-2,0,0,0,0\}$ and the units in Table 5 shows that unit 3, temperature, cannot contribute to the result. Pruning this unit from the table prior to the search accelerates the search, resulting in the following table of units to be used:

TABLE 6

| Dimension | Unit | Plural | Abbv | Signature | Scale | Offset |
|---|---|---|---|---|---|---|
| 0: force | poundf | poundsf | lb | 0,0,1,1,-2,0,0,0,0 | 4.44822162 | 0 |
| 1: distance | inch | inches | in | 0,0,1,0,0,0,0,0,0 | 0.0254 | 0 |
| 2: time | hour | hours | hr | 0,0,0,0,1,0,0,0,0 | 3600. | 0 |

The process is called initially at 100 with:

Step 1:j:0 Target: $\{0,0,-1,1,-2,0,0,0,0\}$ Result:1 the target vector equal to $\{0,0,-1,1,-2,0,0,0,0\}$, index j=0, and the result=null.

Since the Target is not null at 110, at 140 we select U to be element 0 of the list of units, in this case lb.

The first test performed 150 is a heuristic one, restricting results to those considered legal. Illegal units are those which are either physically impossible, or just ugly in practice. Illegal units include for example those which cannot be represented in the 1451.2 standard. These include compound units where one unit is logarithmic, e.g. pH-inches; compound units where one unit has an offset, e.g. degrees F/mile; and compound units where one unit is dimensionless, e.g. (volts/volt)-hours. Those pruned heuristically include compound units including both frequency and time; compound units including different units for the same dimension, e.g. area in foot-meters; and mixed SI and non-SI units, e.g.kg/ft$^3$. Some users may wish to allow mixed SI and non SI units in the result.

Given the selected unit U and the target, we see 160 if dividing the target by U reduces its magnitude, or 180 if multiplying the target by U reduces its magnitude. Here,

| | | |
|---|---|---|
| Target: | {0,0,-1,1,-2,0,0,0} | magnitude: 8 |
| U: (lb) | {0,0,1,1,-2,0,0,0,0} | |
| Target/U: | {0,0,-2,0,0,0,0,0,0} | magnitude: 4 |
| Target*U: | {0,0,0,2,4,0,0,0,0} | magnitude: 12 | shown as:

Step 2:J:0 target mag:8 target/u mag:4 target*u mag:12

So simplification (i.e. reduction of magnitude) is achieved by selecting U, dividing the target by U, multiplying the result by U, and multiplying the result's scale factor by U's scale factor, giving:

Step 3:j:0 Target: {0,0,-2,0,0,0,0,0,0} Result: lb Scale:4.44822162

We did not choose to multiply the target by U, since that would have increased the magnitude to 12.

At 170 we recursively call the process 100 examining element 0, or lb. The magnitude of the target is 4, and would be 12 if we select target/U at 160, and 8 if we select target*U at 180. Since both these are greater than the current magnitude, neither is selected.

Step 4:j:0 target mag:4 target/u mag:12 target*u mag:8

We therefore advance to 200 incrementing j to 1. We now examine unit 1, in at 140. The magnitude of the target is still 4. It would become 6 if we selected target/U at 160, and would become 2 if we select target*U at 180.

Step 5:J:1 target mag:4 target/u mag:6 target*u mag:2

So we recurse 190 with j=1 continuing to examine unit 1, in. We recursively call with the target multiplied by in, the result divided by in, and the scale factor multiplied similarly:

Step 6:J:1 Target: {0,0,-1,0,0,0,0,0,0} Result: lb/in Scale:175.1268354

Now the first candidate is unit 1, in. The magnitude of the target is 2, and would become 4 if we selected target/U and 0 if we select target/U.

Step 7:J:1 target mag:2 target/u mag:4 target*u mag:0

We recurse 190 with this unit as our starting place, the target again multiplied by in, and the result again divided by in, and the scale factor handled similarly:

Step 8:J:1 Target: {0,0,0,0,0,0,0,0,0} Result: lb/in$^2$ Scale:6894.7573

Since the magnitude of the target is now zero at 110, an answer has been found. The result is added to the output list at 120, the associated scale factor computed and we return 130.

The search continues at 200, since there may be more than one equivalent unit. We set j to 2 and look at the next candidate unit, hr, since the end of the list has not been reached 210. The magnitude of the target is still 2, and would become 4 if we selected either hr$^{+1}$ or hr$^{-1}$, so we do not select either. Since there are no more candidates, we pop up one recursion level 220 and continue the recursive search.

The search continuing in this fashion does not produce any other equivalent units, so we return lb/in$^2$ as our only result.

The search as described works from current values of j to the end of the list, thereby pruning half the search space. This eliminates effective duplicates such as amp-hours and hour-amps. As the search strategy insists on decreasing magnitude at each step, it will not produce units that have a temporary increase in magnitude that is later reduced. This is deemed acceptable as it only seems to omit overly complex unit names.

Note that the process herein described may produce more than one equivalent unit name for a given target. When more than one unit name is produced, the unit names may be ranked according to magnitude in terms of the user-defined units used; unit names of lesser magnitude being arguably "simpler" and therefore more palatable. The user may also be presented with a list of equivalent unit names and asked to select one.

For example, given the target: {0,0,2,1,-3,-2,0,0,0}, which has magnitude 16, the following unit names are equivalent, shown with their magnitudes:

| | |
|---|---|
| Ohm | Magnitude = 2 (Ohm$^1$) |
| v/A | Magnitude = 4 (v$^1$ A$^{-1}$) |
| W/A$^2$ | Magnitude = 6 (W$^1$ A$^{-2}$) |
| (m$^2$kg)/(A$^2$s$^3$) | Magnitude = 16(m$^2$kg$^1$ A$^{-2}$s$^{-3}$) |

The search is assisted by ordering user-defined units in the table to have the most complex first. Placing the most preferred user units at the front of the table ensures they will be examined as candidates first. Additionally, while only a set of user-supplied units spanning possible targets is required to generate user names, a set of user supplied units which covers SI is preferable. Note that this set does not have to be SI units, and may be nonorthogonal.

The foregoing detailed description of the present invention is provided for the purpose of illustration and is not intended to be exhaustive or to limit the invention to the precise embodiments disclosed. Accordingly the scope of the present invention is defined by the appended claims.

What is claimed is:

1. A naming method of computing an output list of one or more equivalent result names for a target expressed as a vector of exponents of SI base units, from a table of user defined units, each said unit having an associated vector of SI base units and a unit name, comprising the steps of:

stepping through the table of user defined units, selecting those units which will reduce the magnitude of the target, for those units which will reduce the magnitude of the target, incorporating the selected unit name into the result and recursively calling the naming method with the target reduced by the selected unit, appending the result to the output list when the magnitude of the target is null, and returning the output list of result names.

2. The method of claim 1 including the preliminary step of removing from the table of user defined units those user defined units which cannot contribute to the result.

3. The method of claim 1 where the table of user defined units includes a plurality of nonorthogonal units.

4. The method of claim 1 where the table of user defined units covers the set of SI units.

5. The method of claim 1 where the step of selecting those units which reduce the magnitude of the target further comprises:

selecting a proposed unit from the table of user defined units, computing the magnitude of the target computing the magnitude of the target divided by the proposed unit, computing the magnitude of the target multiplied by the proposed unit, and selecting a proposed unit if the magnitude of the target divided by the proposed unit is smaller than the magnitude of the target, or if the magnitude of the target multiplied by the target is smaller than the magnitude of the target.

6. The method of claim 1 where scaling factors are associated with each unit in the table of user defined units and scaling factor is computed as part of the naming method.

7. The method of claim 1 where the table of user defined units covers the set of SI units.

8. A naming method of computing an output list of one or more equivalent result names and result scaling factors for a target expressed as a vector of SI base units, from a table of user defined units, each said unit having an associated vector of SI components, a unit name, and a scaling factor, comprising the steps of:

appending the result name and scaling factor to the output list and returning when the target has been reduced to null, selecting a proposed unit from the table of user defined units, evaluating if the name associated with the proposed unit when combined with the current result would produce a legal name, if the proposed unit reduces the magnitude of the target, performing the steps of:

incorporating the unit name associated with the proposed unit into the result name, including the scaling factor associated with the proposed unit in the result scaling factor, recursively calling the naming method with the target reduced by the proposed unit, the result name including the proposed unit name, and the resulting scale factor, and examining each unit in the table of user defined units and returning when all units in the table of user defined units has been examined.

9. The method of claim 8 including the preliminary step of removing from the table of user defined units those user defined units which cannot contribute to the result.

10. The method of claim 8 where the table of user defined units includes a plurality of nonorthogonal units.

11. A computer program product directly leasable into the internal memory of a digital computer, comprising software code portions for performing the steps of claim 1 when said product is run on a computer.

12. A computer program product directly leasable into the internal memory of a digital computer, comprising software code portions for performing the steps of claim 8 when said product is run on a computer.

* * * * *